United States Patent [19]
Kanamori

[11] Patent Number: 5,543,841
[45] Date of Patent: Aug. 6, 1996

[54] SIDE GRIP FOR A VIDEO CAMERA

[75] Inventor: Shion Kanamori, Tokyo, Japan

[73] Assignee: Fuji Photo Film Co., Ltd., Kanagawa, Japan

[21] Appl. No.: 229,132

[22] Filed: Apr. 18, 1994

Related U.S. Application Data

[63] Continuation of Ser. No. 931,343, Aug. 18, 1992.

[30] Foreign Application Priority Data

Aug. 19, 1991 [JP] Japan .................... 3-206816

[51] Int. Cl.⁶ .............................. H04N 5/225
[52] U.S. Cl. ............................ 348/375; 348/376
[58] Field of Search .................... 348/207, 373, 348/374, 375, 376, 333; 354/74, 80, 81, 226; 292/251.5; 358/335; H04N 5/225

[56] References Cited

U.S. PATENT DOCUMENTS

| | | | |
|---|---|---|---|
| 4,702,506 | 10/1987 | Iimura | 292/251.5 |
| 4,959,929 | 9/1990 | Fukuda et al. | 358/229 |
| 5,043,822 | 8/1991 | Ichiyoshi et al. | 358/229 |
| 5,132,800 | 7/1992 | Wada et al. | 358/209 |
| 5,142,746 | 9/1992 | Morita | 24/303 |

FOREIGN PATENT DOCUMENTS

| | | | |
|---|---|---|---|
| 62-136176 | 6/1987 | Japan | H04N 5/225 |
| 1-22177 | 1/1989 | Japan | H04N 5/225 |
| 2-183674 | 7/1990 | Japan | H04N 5/225 |
| 2-185168 | 7/1990 | Japan | H04N 5/225 |
| 2-311089 | 12/1990 | Japan | H04N 5/225 |
| 3-001411 | 1/1991 | Japan | H04N 5/225 |
| 3-38167 | 2/1991 | Japan | H04N 5/225 |

*Primary Examiner*—Joseph Mancuso
*Assistant Examiner*—Tuan V. Ho
*Attorney, Agent, or Firm*—Sughrue, Mion, Zinn, Macpeak & Seas

[57] ABSTRACT

A video camera having a side grip including a thumb rest which can achieve its intended purpose while not increasing the transverse width of the video camera. The video camera includes a video camera main body having a storage cavity in which a rotary member and the thumb rest are capable of being freely rotatable in and out of the storage cavity. In a recording mode, the rotary member and thumb rest are rotated so that the thumb rest is projected out from the video camera main body. In a storage position, at least a portion of the rotary member and the thumb rest are disposed within the storage cavity of the video camera main body.

12 Claims, 7 Drawing Sheets

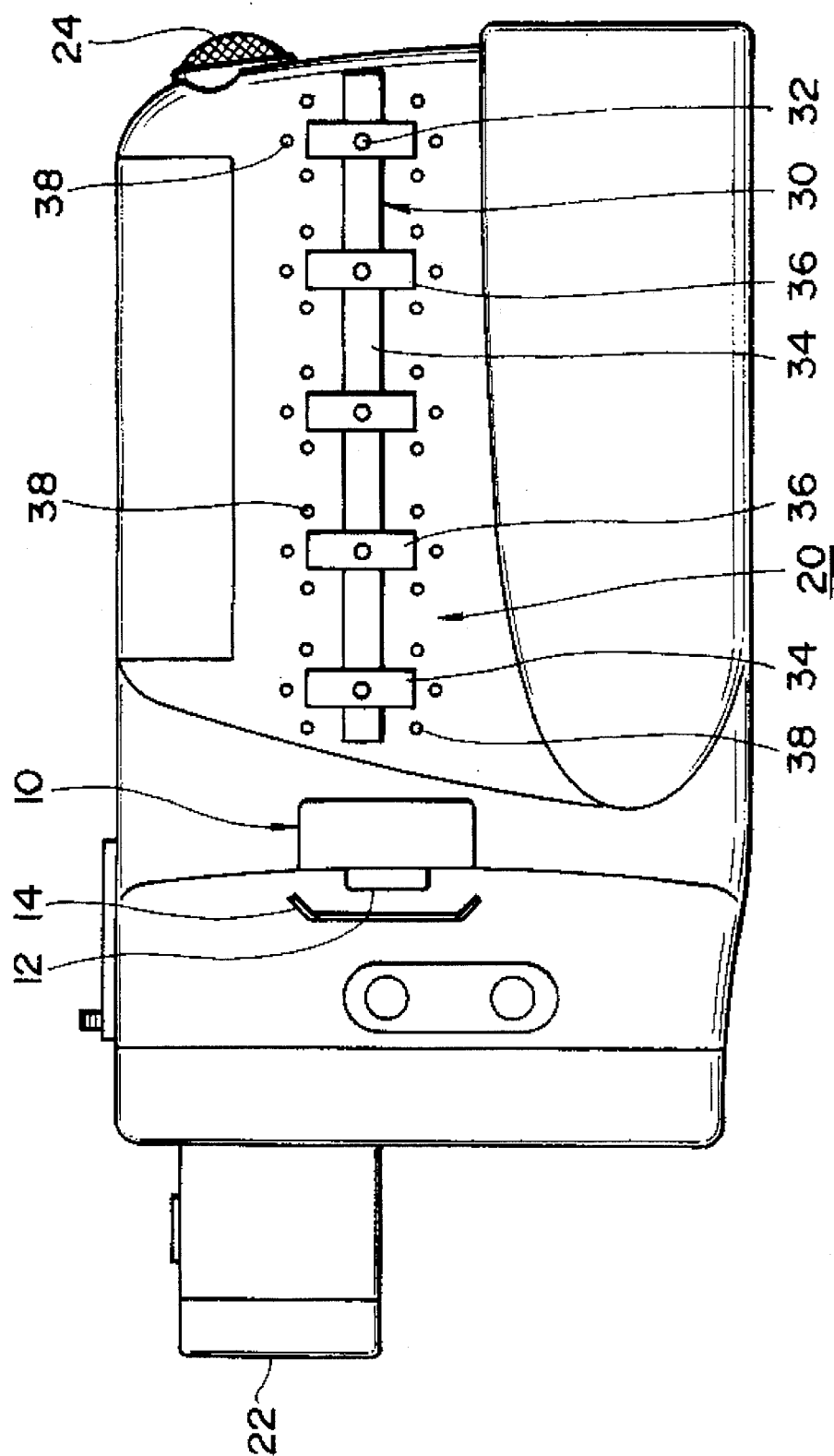

SIDE GRIP FOR A VIDEO CAMERA

This is a continuation of application Ser. No. 07/931,343 filed Aug. 18, 1992, now abandoned.

BACKGROUND OF THE INVENTION

1. Field of the Invention

The present invention relates to a side grip for a video camera and, in particular, to a desirable shape of a side grip for a video camera which is compact in size and light weight.

2. Description of the Related Art

In general, a side grip for a video camera is provided in either side portion of a video camera main body and includes a recording button which can be operated with an operator's thumb when the side grip is gripped by the operator. If the recording button is pushed while picture recording is temporarily stopped, then recording is started and, if the recording button is pushed again, then the recording is caused to stop temporarily. After the recording is started, when the recording button is not operated, the thumb is placed on a thumb rest which is disposed adjacent to the recording button. The thumb rest has an important influence on the stable holding of a camera in photographing. However, the thumb rest results in increasing the thickness of the video camera.

In view of the above problem, and, in order to reduce the thickness of the video camera, as shown in FIG. 9, there has been proposed a structure in which a thumb rest 1 is disposed rotatably around a recording button 2 and, when the thumb rest 1 is in use, the thumb rest 1 is rotated counterclockwise in FIG. 9 to thereby project out from a side portion (that is, a side grip 3) of a video camera main body so that a space for the thumb rest can be secured.

However, the thumb rest made by the rotational movement of the thumb rest 1 cannot be large because of space limits and, therefore, the thumb rest 1 cannot achieve all of its function to a full extent.

SUMMARY OF THE INVENTION

The present invention aims at eliminating the drawbacks found in the above-mentioned conventional side grip for a video camera.

Accordingly, it is an object of the invention to provide a side grip for a video camera which is able to satisfy the function of a thumb rest when the video camera is held by means of the side grip and at the same time is capable of reducing the thickness of a main body of the video camera.

In order to attain the above object, according to the invention, there is provided a side grip for a video camera which is disposed in a side portion of a main body of a video camera and includes a recording button to be operated with an operator's thumb when the video camera is gripped by the operator, wherein a thumb rest, on which the operator puts his or her thumb when the recording button is not in operation, is disposed so as to be free to rotate in the horizontal direction of the video camera main body and the thumb rest is projected out from the video camera main body in photographing.

According to the invention, when the video camera is not in use, the thumb rest is rotated and stored in the video camera main body, which can prevent the video camera main body from increasing in thickness. Also, when the video camera is in use, the stored thumb rest is rotated and projected from the video camera main body, thereby satisfying the function of a thumb rest when holding the video camera.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is a right side view of the video camera shown in FIG. 1;

FIG. 4 (B) is an enlarged view of the main portions of the rotary member, illustrating the stored state thereof;

FIG. 5 (B) is an enlarged view of the main portions of the embodiment, illustrating the stored state thereof;

FIG. 7 (B) is a side view of the same grip holder;

DESCRIPTION OF THE PREFERRED EMBODIMENT

Detailed description will hereunder be given of the preferred embodiment of a side grip for a video camera according to the present invention with reference to the accompanying drawings.

Figure 1:
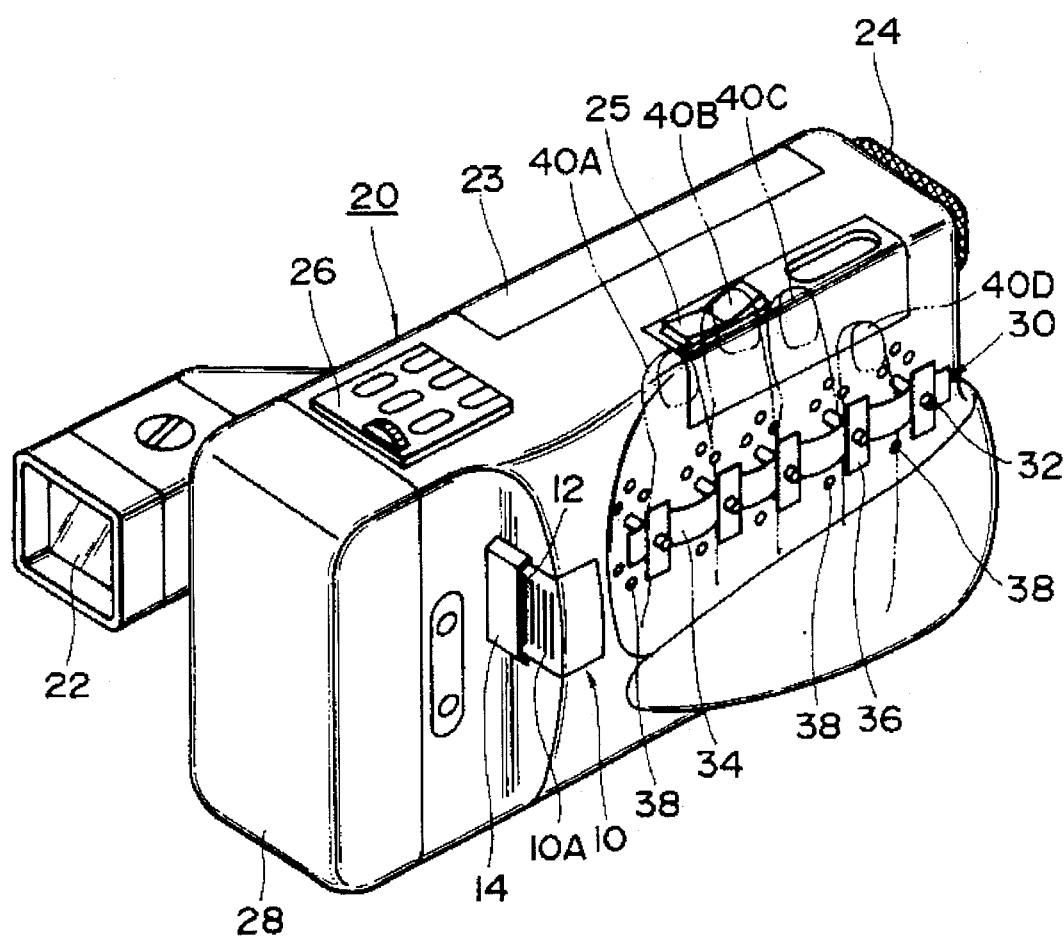
FIG. 1 is a perspective view of an embodiment of a video camera having a side grip with a thumb rest according to the invention, when viewed obliquely from behind.
Figure 2:
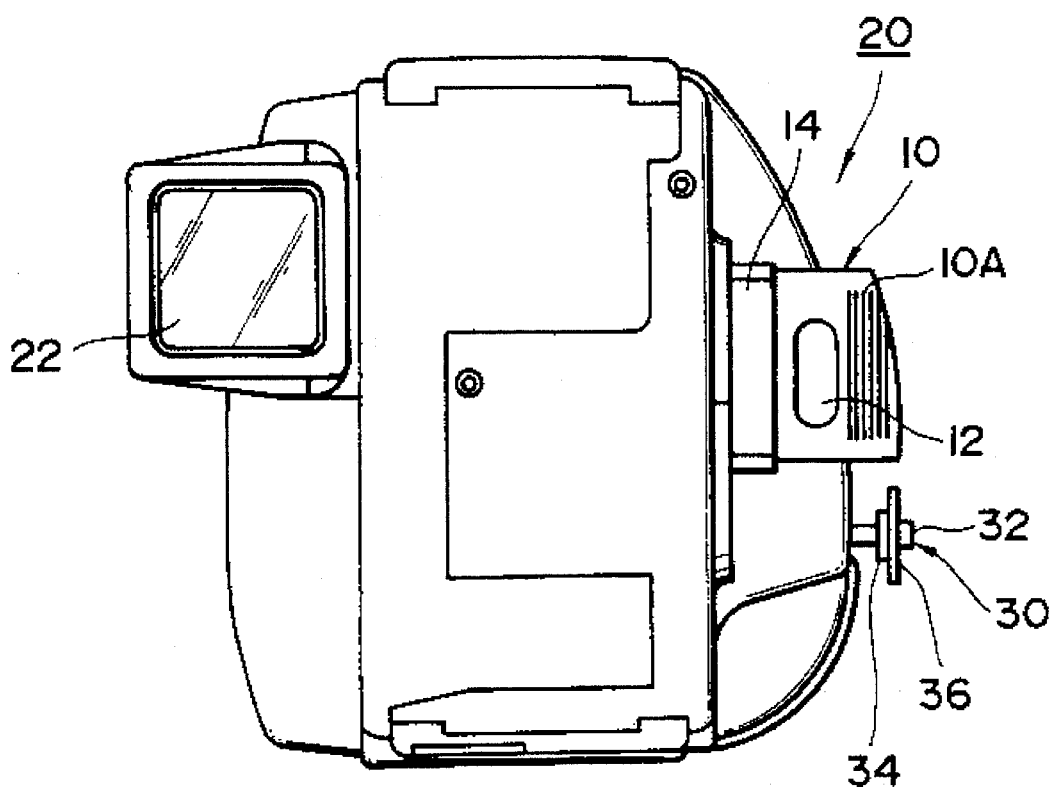
FIG. 2 is a back view of the embodiment of the video camera shown in FIG. 1 with the thumb rest disposed for photographing.

FIGS. 1, 2 and 3 are respectively a back perspective view, a back view and a right side view of an embodiment of a video camera having a side grip according to the invention. In FIG. 2, there is shown a thumb rest 10A projected out from a video camera main body 20 (more particularly, a video camera right side box body which forms a side grip).

As shown in these figures, in the video camera main body 20, there is disposed a rotary member 10 having a substantially triangular prism shape in such a manner that it is free to rotate in a direction of arrows (in a right and left or horizontal direction of the video camera main body 20) in FIG. 1. There is provided a thumb rest 10A in the back surface of the rotary member 10 and a recording button 12 is disposed on the left side of the thumb rest 10A (see FIGS. 2 and 4).

Figure 4A:
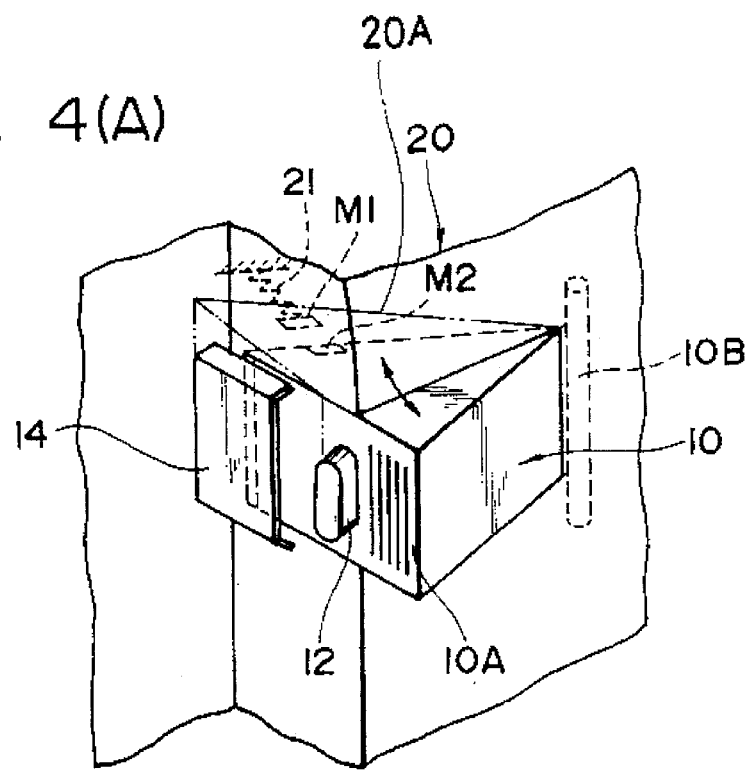
FIG. 4 (A) is an enlarged view of main portions of a rotary member provided in a side grip according to the invention, illustrating the photographing state thereof.
Figure 4B:
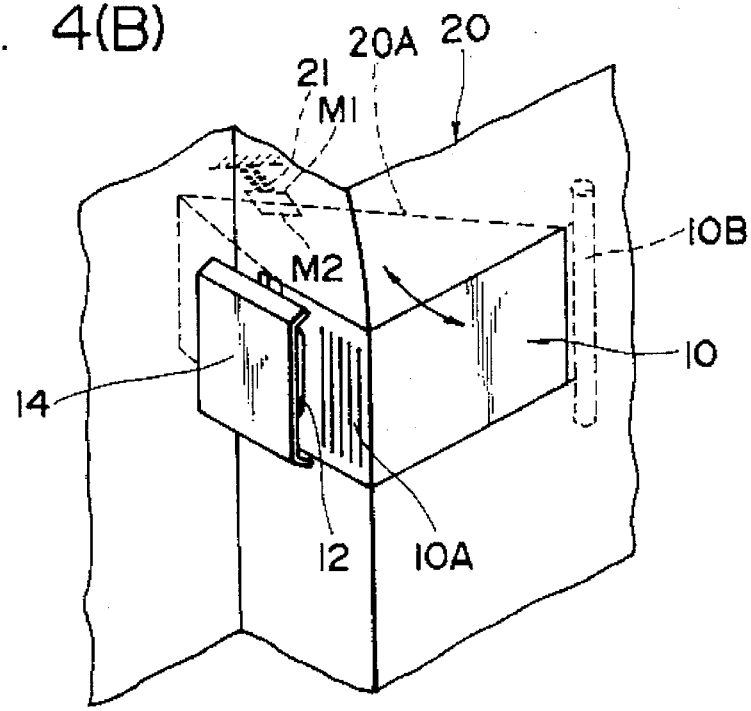

FIGS. 4 (A) and (B) are respectively enlarged views of the main portions of the video camera main body including the rotary member 10 having the thumb rest provided therein. Specifically, in FIG. 4 (A), the rotary member 10 is projected out of the video camera main body 20; and, in FIG. 4 (B), the rotary member 10 is stored in the video camera main body 20.

As shown in FIG. 4 (A), the rotary member 10 is rotated about a shaft 10B in such a manner that a right half section thereof having the thumb rest 10A provided therein is projected out from the side surface of the video camera main body 20. A left half section of the thumb rest 10A remains in the storage cavity 20A of the video camera main body 20. Also, in the video camera main body 20, there is provided lock means for holding the rotary member 10 in its storage position when the rotary member 10 is stored in the video camera main body 20. The lock means includes on the side of the video camera main body a first magnet M1 which and the spring 21 energizes the magnet M1 in the right direction of the video camera main body 20. Further, the lock means includes on the side of the rotary member 10 a second magnet M2 at a position which is opposed to the position of the first magnet M1 as shown in FIG. 4 (B), when the rotary member 10 is stored, the first and second magnets M1 and M2 are interconnected with each other.

In this manner, the rotary member 10 can be held in its storage position, as shown in FIG. 4 (B). Also, if the rotary member 10 while in the storage position is pushed in the direction of the video camera main body 20, then the spring 21 of the lock means is compressed. In this state, if a thumb pressing against the rotary member 10 is released, then the rotary member 10 is rotated, due to the reacting force of the spring 21 conserved therein, in a direction where the rotary member 10 is projected out from the video camera main body 20.

Due to this, a force of inertia acts to rotate the rotary member 10 in the outward direction thereof and thus the rotary member 10 is caused to rotate in the outward direction, thereby disconnecting the first and second magnets M1 and M2. After the first and second magnets M1 and M2 disconnect, if a photographer rotates the rotary member 10 further in the outward direction to draw it out to a recording position, then the rotary member 10 can be clicked stopped every given position by means of a click mechanism (which is not shown). This allows the photographer to move the recording button 12 to the optimum position corresponding to the size of a photographer's right hand holding the video camera, so that there can be provided an excellent shape which is suitable for the thumb rest of the right hand when holding the video camera.

In this case, alternatively, there may be provided a spring which energizes the rotary member 10 in the projection direction thereof, whereby the rotary member 10 can be automatically rotated by the spring and can be clicked stopped without the photographer's rotating the rotary member 10 outwardly. Further, one of the first and second magnets M1 and M2 may be formed of a metal member.

Also, as shown in FIGS. 4 (A) and (B), there is disposed a cover 14 in the rear of the recording button 12. The recording button 12 is covered with the cover 14 when the rotary member 10 is held in its storage position, while the button 12 is exposed out of the cover 14 when the rotary member 10 is held in its recording position. Alternatively, the cover 14 may be omitted. That is, the video camera main body 20 may be structured such that, when the rotary member 10 is stored in its storage position, the recording button 12 can be stored completely within the video camera main body 20.

Although in the illustrated embodiment the recording button 12 is on the rotary member 10, this is not limitative but, alternatively, the recording button 12 may be fixed to positions on the side of the video camera main body 20 other than the rotary member 10.

Figure 5A:
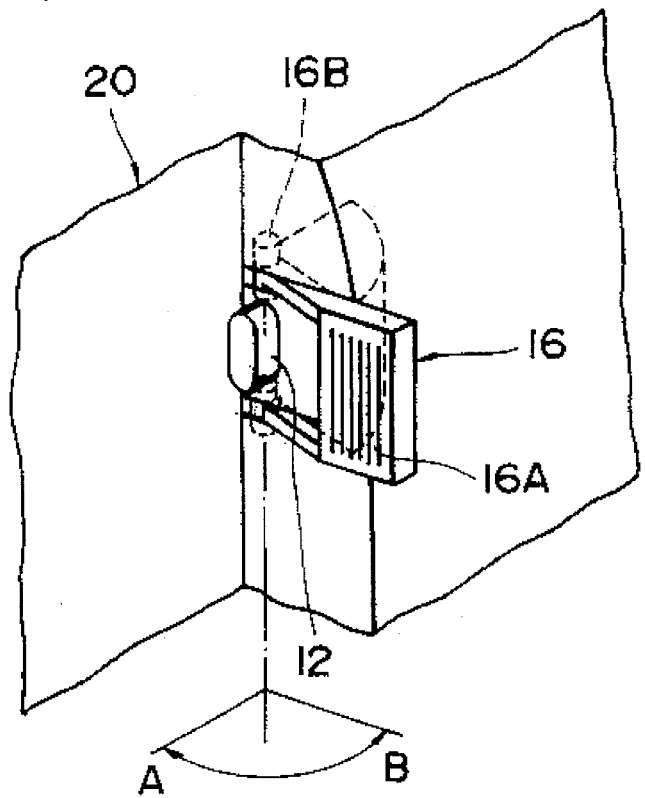
FIG. 5 (A) is an enlarged view of main portions of another embodiment of a side grip according to the invention, illustrating the photographing state thereof.
Figure 5B:
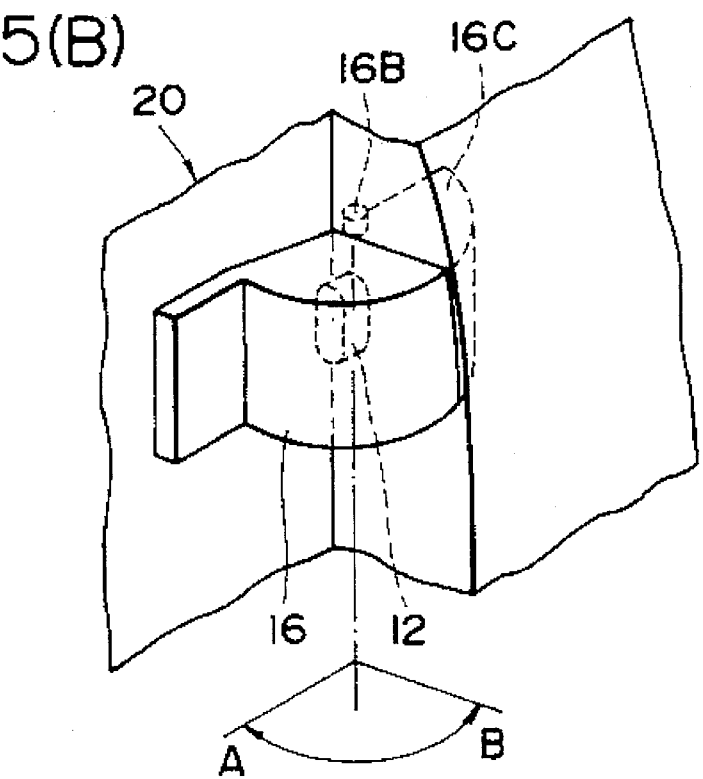

Also, although in the above-illustrated embodiment the rotary member 10 is used to place the recording button 12 in its storage and recording positions, this is not limitative but, as shown in FIGS. 5 (A) and (B), the recording button 12 may be fixed to the video camera main body 20 and a cover 16 for covering the recording button 12 may be provided in such a manner that it is free to rotate about a shaft 16B. In other words, the cover 16 is formed in a shape of a ¼ division of a cylindrical body and includes a thumb rest 16A which is extended from one end thereof. Also, the cover 16 is stored in a storage cavity 16C which is provided within the video camera main body 20. Due to this structure, the thumb rest 16A can be rotated 90° between A and B points, so that the cover 16 can be closed at the A point to thereby cover the recording button 12 and also the cover can be opened at the B point to thereby expose the recording button 12 such that the recording button 12 can be pressed for the recording operation.

Figure 6A:
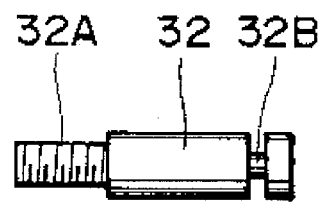
FIGS. 6 (A) and 6 (B) are side views of a pin forming a grip holder of a video camera to which a side grip according to the invention is applied.
Figure 6B:
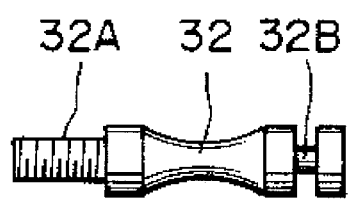

As shown in FIG. 1, the video camera main body 20 includes a grip holder 30 mounted to the right side portion thereof. The grip holder 30 comprises a plurality of pins 32, a belt 34 and a plurality of plates 36 and, as shown in FIG. 6 (A), the pin 32 includes an external thread 32A in the left end portion thereof and a groove 32B in the right end portion thereof. As shown in FIG. 6(B), the pin 32 includes therein a recessed portion, which makes it easier to hold the pin 32 between the photographer's fingers. As shown in FIG. 1, the belt 34 and plate 36 are engaged with the groove 32B.

The external thread 32A of the pin 32 is threadedly connected with each of internal threads 38 respectively formed on the right side portion of the video camera main body 20. This enables the grip holder 30 to be mounted onto the right side portion of the video camera main body 20. And, in photographing, as shown in FIG. 1, respective fingers 40A, 40B, 40C and 40D of a photographer can be inserted between the pins 32 of the grip holder 30. Also, due to provision of a plurality of internal threads 38 on the right side portion of the video camera main body 20, the photographer is able to mount the pins 32 at arbitrary positions in the internal threads 38 according to the thickness and length of his or her fingers.

Figure 7A:
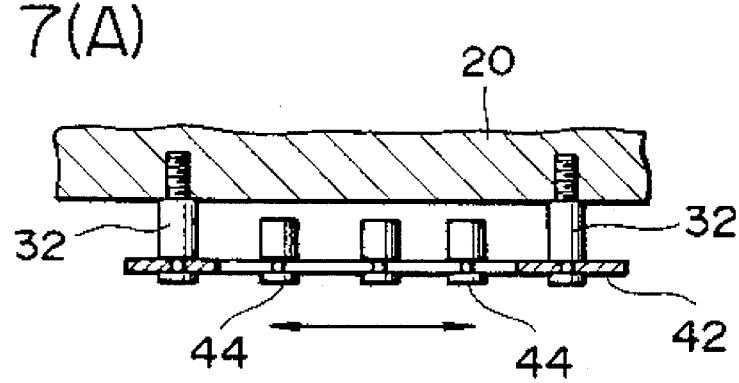
FIG. 7 (A) is a section view of another embodiment of a grip holder of a video camera to which a side grip according to the invention is applied.
Figure 7B:
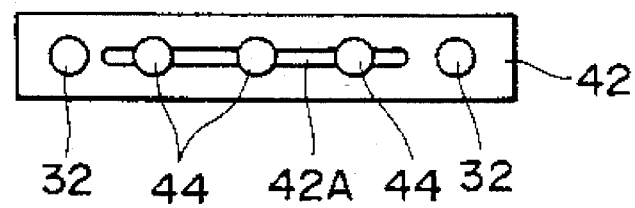

In the above-mentioned embodiment, the belt 34 is mounted to the pins 32. However, this is not limitative, but alternatively there can be employed such a structure as shown in FIGS. 7(A) and (B). That is, in FIG. 7, a plate 42 is mounted through the pins 32 to the right side portion of the video camera main body 20, and there are provided other pins 44, in an elongated hole 42A formed in the plate in such a manner that the pins 44 are free to move. In this structure, therefore, the pins 44 can be moved according to the thickness of the photographer's fingers. Further, according to cases, the pins 44 may be locked after they are positioned.

The belt 34 and the plate 42 can be made of leather, plastic, gum, cloth or the like.

Figure 8A:
FIGS. 8 (A) and 8 (B) are respectively side views of other embodiments of the pin forming the grip holder of a video camera to which a side grip according to the invention is applied; and, FIG. 9 is a back view of a conventional video camera.
Figure 8B:
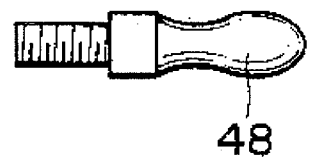
Figure 9:
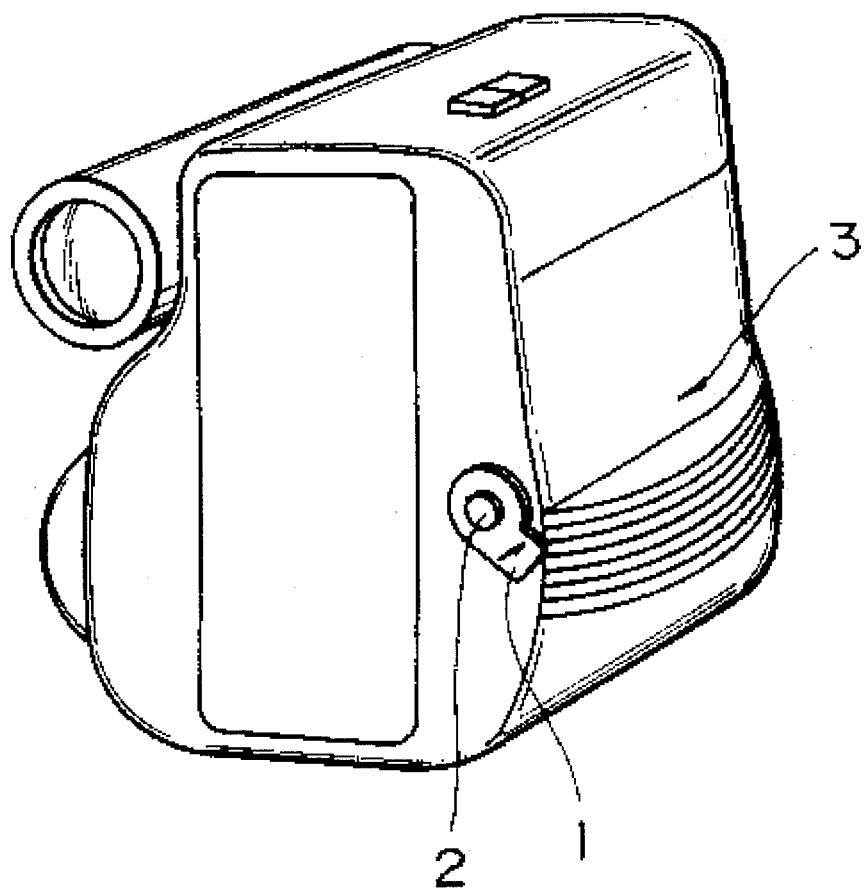

Also, although in the above embodiments the belt 34 or plate 32 is mounted to the pins 32, the present invention is not limited to these embodiments but, alternatively, such pins 46 and 48 as shown in FIGS. 8 (A) and (B) may be mounted to the video camera main body 20. In this case, the pins 46 or pins 48 are held between the photographer's fingers without using the belt 34 or plate 42. Also, the pin 48 includes therein a recessed portion, which makes it easier to hold the pin 48 between the photographer's fingers. According to cases, as the pin 46, there may be prepared several kinds of pins which are different in length from one another.

Referring back again to FIG. 1, reference character 22 designates a view finder, 23 a cassette storage part, 24 a microphone, 25 a tele-wide switch, 26 an operation part, and 28 a battery.

As has been described hereinbefore, according to a side grip for a video camera in accordance with the present invention, a thumb rest for a photographer to place his or her thumb thereon when a recording button is not in operation is disposed so as to be free to rotate in the right and left direction of a video camera main body and thus so as to be projectable out of the video camera main body in photographing, whereby the thumb rest can be formed as a convenient thumb rest when the video camera is held by the side grip and also the transverse width of the video camera main body can be minimized.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A video camera, comprising:
   a video camera main body having a storage cavity provided in a side portion of said video camera main body;
   a rotary member movably coupled to the side portion of said video camera main body, at least a portion of said rotary member being freely movable in and out of said storage cavity; and
   a thumb rest disposed in said rotary member, wherein, in a recording mode, said rotary member is stored in said storage cavity and said thumb rest is projecting outward from the side portion of said video camera main body and, when in a storage position, said rotary member is drawn out from said storage cavity and said thumb rest is disposed adjacent to the side portion of said video camera main body.

2. A side grip for a video camera as set forth in claim 1, wherein said rotary member is disposed in the side portion of said video camera main body and freely rotatable about a vertical axis of said video camera main body.

3. A video camera as set forth in claim 2, further comprising a recording button disposed in the side portion of said video camera main body adjacent to said rotary member, wherein when in the storage position said rotary member is drawn out from said storage cavity and said thumb rest is disposed adjacent to the side portion of said video camera main body so as to cover said recording button.

4. A video camera, comprising:
   a video camera main body including a side portion and a grip portion;
   a thumb rest movably disposed in said side portion of said video camera main body;
   a recording button provided in said thumb rest; and
   a thumb rest storage cavity, formed in said side portion of said video camera main body, for storing said thumb rest, wherein at least a portion of said thumb rest is freely movable, independently of said grip portion, in said thumb rest storage cavity to be stored therein and out of said thumb rest storage cavity so as to protrude therefrom, such that it is impossible to operate said recording button when said thumb rest is stored in said thumb rest storage cavity, while it is possible to operate said recording button when said thumb rest is protruded from said thumb rest storage cavity.

5. A video camera as set forth in claim 4, wherein said thumb rest moves into and out of said thumb rest storage cavity in a direction which is perpendicular to said side portion of said video camera main body.

6. A video camera as set forth in claim 4, further comprising a rotary member disposed in the side portion of said video camera main body, said rotary member being rotatable about a vertical axis of said video camera main body and said thumb rest being disposed on a surface of said rotary member, wherein said thumb rest and said rotary member are drawn from the thumb rest storage cavity when in a recording mode, and stored in said thumb rest storage cavity when in a storage position.

7. A video camera as set forth in claim 6, further comprising a recording button disposed on the surface of said rotary member.

8. A side grip for a video camera as set forth in claim 7, wherein said recording button is disposed adjacent to said thumb rest on said rotary member.

9. A video camera as set forth in claim 8, further comprising lock means for locking said rotary member in the thumb rest storage cavity when in the storage position.

10. A video camera as set forth in claim 9, wherein said lock means comprises a first magnet disposed on a side of said video camera main body; and a second magnet disposed on a side of said rotary member.

11. A video camera as set forth in claim 10, further comprising a spring coupled to said first magnet and said video camera main body for forcing said rotary member out of the thumb rest storage cavity due to a reaction force produced when said rotary member is pushed towards said video camera main body.

12. A video camera as set forth in claim 11, wherein said video camera main body comprises a cover for covering said recording button when said rotary member is stored within the thumb rest storage cavity in the storage position.

* * * * *